(12) United States Patent
Abe et al.

(10) Patent No.: US 11,792,600 B2
(45) Date of Patent: Oct. 17, 2023

(54) COLLECTION DEVICE, MEASUREMENT TERMINAL, COLLECTION SYSTEM, COLLECTION METHOD, MEASUREMENT METHOD, COLLECTION PROGRAM, AND MEASUREMENT PROGRAM

(71) Applicant: NIPPON TELEGRAPH AND TELEPHONE CORPORATION, Tokyo (JP)

(72) Inventors: Naoto Abe, Tokyo (JP); Hitoshi Seshimo, Tokyo (JP); Hiroshi Konishi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 119 days.

(21) Appl. No.: 17/618,834

(22) PCT Filed: Jun. 14, 2019

(86) PCT No.: PCT/JP2019/023769
§ 371 (c)(1),
(2) Date: Dec. 13, 2021

(87) PCT Pub. No.: WO2020/250449
PCT Pub. Date: Dec. 17, 2020

(65) Prior Publication Data
US 2022/0360937 A1    Nov. 10, 2022

(51) Int. Cl.
*H04W 4/021* (2018.01)
*H04W 4/38* (2018.01)
(Continued)

(52) U.S. Cl.
CPC ............. *H04W 4/021* (2013.01); *H04W 4/38* (2018.02); *H04W 48/02* (2013.01); *H04W 72/0446* (2013.01)

(58) Field of Classification Search
CPC ....... H04W 4/02; H04W 4/021; H04W 4/029; H04W 4/38; H04W 24/10; H04W 48/02;
(Continued)

(56) References Cited

U.S. PATENT DOCUMENTS 6,279,055 B1 * 8/2001 Ito ............................. G06F 5/16
710/29
6,747,990 B1 * 6/2004 Umayabashi ....... H04L 12/5602
370/468

(Continued)

FOREIGN PATENT DOCUMENTS

JP            201922045 A        2/2019

*Primary Examiner* — Jean A Gelin

(57) ABSTRACT

A collection device includes a deciding unit that, on the basis of data obtained in advance for each area, decides a collection interval and a collection time for each of the areas, a communication unit that acquires a current position from each of measurement terminals, and an allocating unit that, in a case where there is an area corresponding to the current position acquired regarding each of the measurement terminals, calculates a slot count of slots regarding which the collection interval and the collection time are cyclically allocated, on the basis of the collection interval and the collection time of this area, and allocates slot Nos. of an amount equivalent to the slot count, to any of the measurement terminals present in this area, by a predetermined method. The communication unit transmits, to each of the measurement terminals to which slot Nos. are allocated, the collection interval of the area in which the measurement terminal is present, the collection time of this area, the slot count of this area, and the slot No. allocated to the measurement terminal, and receives measurement information including measurement data measured on the basis of the collection interval and the collection time, from each of the measurement terminals to which slot Nos. are allocated.

9 Claims, 7 Drawing Sheets

(51) Int. Cl.
*H04W 48/02* (2009.01)
*H04W 72/0446* (2023.01)

(58) Field of Classification Search
CPC ..... H04W 72/0446; H04Q 9/00; H04L 67/12; H02D 30/70
See application file for complete search history.

(56) References Cited

U.S. PATENT DOCUMENTS

| | | | | |
|---|---|---|---|---|
| 2003/0179769 A1* | 9/2003 | Shi | ............... | H04J 3/1694 370/468 |
| 2006/0198366 A1* | 9/2006 | Liang | ............... | H04L 49/101 370/380 |
| 2006/0221994 A1* | 10/2006 | Cho | ............... | H04L 12/413 370/458 |
| 2007/0115904 A1* | 5/2007 | Chen | ............... | H04W 72/20 370/338 |
| 2007/0293231 A1* | 12/2007 | So | ............... | H04W 72/23 455/450 |
| 2008/0056205 A1* | 3/2008 | Nagai | ............... | H04L 5/1469 370/336 |
| 2008/0084898 A1* | 4/2008 | Miyaho | ............... | H04L 47/12 370/498 |
| 2008/0188232 A1* | 8/2008 | Park | ............... | H04W 72/542 455/450 |
| 2009/0059849 A1* | 3/2009 | Namba | ............... | H04L 61/5038 370/328 |
| 2009/0254676 A1* | 10/2009 | Joo | ............... | H04L 12/4625 709/236 |
| 2010/0085190 A1* | 4/2010 | Sueoka | ............... | H04Q 9/00 340/10.3 |
| 2014/0169290 A1* | 6/2014 | Seok | ............... | H04W 74/006 370/329 |
| 2016/0057561 A1* | 2/2016 | Kami | ............... | H04W 68/005 370/329 |
| 2017/0117757 A1* | 4/2017 | Park | ............... | H04W 56/001 |
| 2018/0115447 A1* | 4/2018 | Hasegawa | ............... | H04W 72/0453 |
| 2018/0336075 A1* | 11/2018 | Cairns | ............... | G06F 16/2462 |
| 2021/0314923 A1* | 10/2021 | Zhao | ............... | H04L 5/0078 |

* cited by examiner

COLLECTION DEVICE, MEASUREMENT TERMINAL, COLLECTION SYSTEM, COLLECTION METHOD, MEASUREMENT METHOD, COLLECTION PROGRAM, AND MEASUREMENT PROGRAM

CROSS-REFERENCE TO RELATED APPLICATIONS

This application is a U.S. National Stage Application filed under 35 U.S.C. § 371 claiming priority to International Patent Application No. PCT/JP2019/023769, filed on 14 Jun. 2019, the disclosure of which is hereby incorporated herein by reference in its entirety.

TECHNICAL FIELD

The technology of the present disclosure relates to a collection device, a measurement terminal, a collection system, a collection method, a measurement method, a collection program, and a measurement program.

BACKGROUND ART

There conventionally is technology in which position information of terminals is transmitted to a collection device that is a server, and the collection device side instructs collection to terminals regarding which there is a likelihood of being able to collect desired data, to collect measurement data from sensors.

For example, there are a data collection device and a data measurement terminal for suppressing increase in processing load on a server device, while suppressing omission from collection of measurement data that is an object (see PTL 1, for example). In this technology, the data measurement terminal transmits measurement data to the data collection device in a case where the terminal itself is situated within a geographical range.

CITATION LIST

Patent Literature

[PTL 1] Japanese Patent Application Publication No. 2019-22045

SUMMARY OF THE INVENTION

Technical Problem

However, there is a problem in that acquiring by a sensor and transmitting measurement data at all times, by all measurement terminals regarding which there is a likelihood of being able to collect data, increases the battery consumption of the measurement terminals.

The technology of the disclosure has been made in view of the foregoing, and it is an object thereof to provide a collection device, a measurement terminal, a collection system, a collection method, a measurement method, a collection program, and a measurement program, capable of efficiently collecting measurement data so as to suppress electric power consumption of the entire system.

Means for Solving the Problem

A first aspect of the present disclosure is a collection device, including a deciding unit that, on the basis of data obtained in advance for each area, decides a collection interval and a collection time for each of the areas, a communication unit that acquires a current position from each of measurement terminals, and an allocating unit that, in a case where there is the area corresponding to the current position acquired regarding each of the measurement terminals, calculates a slot count of slots regarding which the collection interval and the collection time are cyclically allocated, on the basis of the collection interval and the collection time of this area, and allocates the slot Numbers of an amount equivalent to the slot count, to any of the measurement terminals present in this area, by a predetermined method. The communication unit transmits, to each of the measurement terminals to which the slot Numbers are allocated, the collection interval of the area in which the measurement terminal is present, the collection time of this area, the slot count of this area, and the slot number allocated to the measurement terminal, and receives measurement information including measurement data measured on the basis of the collection interval and the collection time, from each of the measurement terminals to which the slot numbers are allocated.

A second aspect of the present disclosure is a measurement device, including a communication unit that transmits a current position to a collection device, and a measurement unit that calculates a suppression time which is time to suppress collection, on the basis of a collection interval of an area in which the own terminal is present, a collection time of this area, a slot count of this area, and a slot number allocated to the own terminal, received from the collection device, and after the suppression time elapses, measures the measurement data for the collection time. The communication unit transmits measurement information including the measurement data that is measured, the current position, and the slot number, to the collection device.

A third aspect of the present disclosure is a collection system, including a collection device including a deciding unit that, on the basis of data obtained in advance for each area, decides a collection interval and a collection time for each of the areas, a first communication unit that acquires a current position from each of measurement terminals, and an allocating unit that, in a case where there is the area corresponding to the current position acquired regarding each of the measurement terminals, calculates a slot count of slots regarding which the collection interval and the collection time are cyclically allocated, on the basis of the collection interval and the collection time of this area, and allocates slot numbers of an amount equivalent to the slot count, to any of the measurement terminals present in this area, by a predetermined method, the first communication unit transmitting, to each of the measurement terminals to which the slot numbers are allocated, the collection interval of the area in which the measurement terminal is present, the collection time of this area, the slot count of this area, and the slot number allocated to the measurement terminal, and receives measurement information including measurement data measured on the basis of the collection interval and the collection time, from each of the measurement terminals to which the slot numbers are allocated, and a measurement terminal including a second communication unit that transmits a current position to the collection device, and a measurement unit that calculates a suppression time which is time to suppress collection, on the basis of a collection interval of an area in which the own terminal is present, a collection time of this area, a slot count of this area, and a slot number allocated to the own terminal, received from the collection device, and after the suppression time elapses, measures the measurement data for the collection time, the second communication unit transmitting measurement information including the measurement data that is measured, the current position, and the slot number, to the collection device.

A fourth aspect of the present disclosure is a collection method, including a computer executing processing including deciding, on the basis of data obtained in advance for each area, a collection interval and a collection time for each of the areas, acquiring a current position from each of measurement terminals, calculating, in a case where there is the area corresponding to the current position acquired regarding each of the measurement terminals, a slot count of slots regarding which the collection interval and the collection time are cyclically allocated, on the basis of the collection interval and the collection time of this area, and allocating slot numbers of an amount equivalent to the slot count, to any of the measurement terminals present in this area, by a predetermined method, transmitting, to each of the measurement terminals to which the slot numbers are allocated, the collection interval of the area in which the measurement terminal is present, the collection time of this area, the slot count of this area, and the slot number allocated to the measurement terminal, and receiving measurement information including measurement data measured on the basis of the collection interval and the collection time, from each of the measurement terminals to which the slot numbers are allocated.

A fifth aspect of the present disclosure is a measurement method, including a computer executing processing including transmitting a current position to a collection device, calculating a suppression time which is time to suppress collection, on the basis of a collection interval of an area in which the own terminal is present, a collection time of this area, a slot count of this area, and a slot number allocated to the own terminal, received from the collection device, and after the suppression time elapses, measures the measurement data for the collection time, and transmitting measurement information including the measurement data that is measured, the current position, and the slot number, to the collection device.

A sixth aspect of the present disclosure is a collection program that causes a computer to execute deciding, on the basis of data obtained in advance for each area, a collection interval and a collection time for each of the areas, acquiring a current position from each of measurement terminals, calculating, in a case where there is the area corresponding to the current position acquired regarding each of the measurement terminals, a slot count of slots regarding which the collection interval and the collection time are cyclically allocated, on the basis of the collection interval and the collection time of this area, and allocating slot numbers of an amount equivalent to the slot count, to any of the measurement terminals present in this area, by a predetermined method, transmitting, to each of the measurement terminals to which the slot numbers are allocated, the collection interval of the area in which the measurement terminal is present, the collection time of this area, the slot count of this area, and the slot number allocated to the measurement terminal, and receiving measurement information including measurement data measured on the basis of the collection interval and the collection time, from each of the measurement terminals to which the slot numbers are allocated.

A seventh aspect of the present disclosure is a measurement program that causes a computer to execute transmitting a current position to a collection device, calculating a suppression time which is time to suppress collection, on the basis of a collection interval of an area in which the own terminal is present, a collection time of this area, a slot count of this area, and a slot number allocated to the own terminal, received from the collection device, and after the suppression time elapses, measures the measurement data for the collection time, and transmitting measurement information including the measurement data that is measured, the current position, and the slot number, to the collection device.

Effects of the Invention

According to the technology of the disclosure, measurement data can be efficiently collected so as to suppress electric power consumption of the entire system.

DESCRIPTION OF EMBODIMENTS

An example of an embodiment of the technology of the disclosure will be described below with reference to the figures. Note that in the Figures, components and parts that are the same or equivalent are denoted by the same reference symbols. Also note that the dimensional proportions in the figures may be exaggerated for the sake of description, and may be different from actual proportions.

Figure 1:
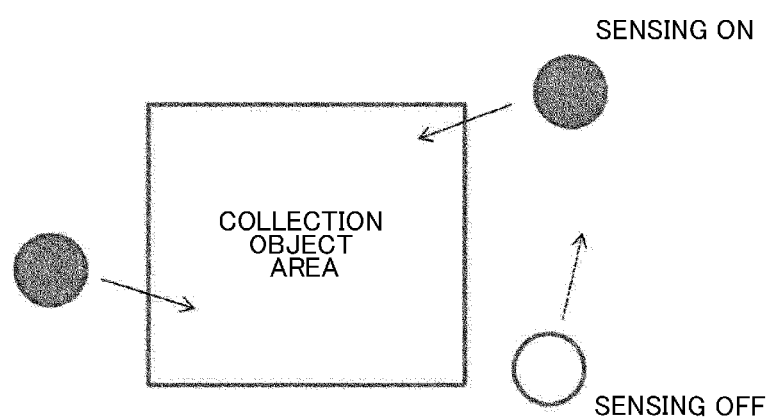
FIG. 1 is a conceptual diagram relating to data collection in accordance with an area, according to a known technique.
Figure 2:
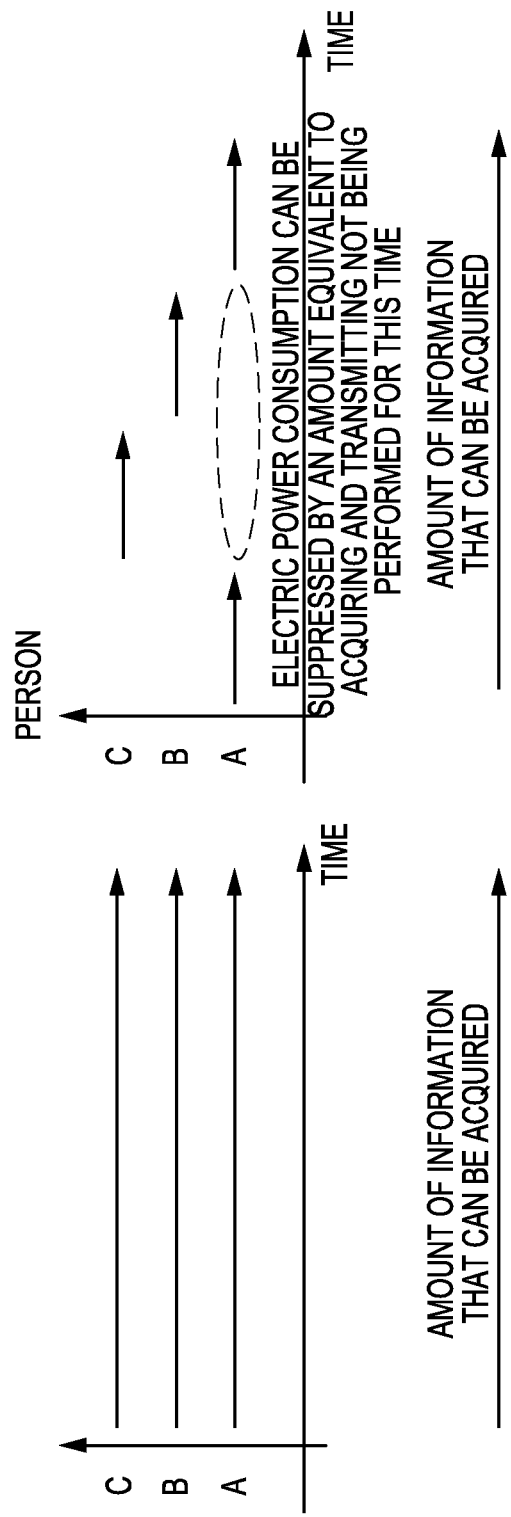
FIG. 2 is a conceptual diagram comparing time axis and collection time between the known technique and the present technique, regarding data collection.

First, an overview of the technology of the present disclosure will be described. FIG. 1 is a conceptual diagram relating to data collection in accordance with an area, according to a known technique. FIG. 2 is a conceptual diagram comparing time axis and collection time between the known technique and the present technique, regarding data collection. As illustrated in FIG. 1, sensing is turned ON when entering a collection target area, and sensing is turned OFF when outside of the collection target area. To the left in FIG. 2 is a case in which the measurement terminals that individuals A through C possess collect measurement data over all time. In this case, the collection time is redundant among the measurement terminals of the individuals A through C. However, when considering that having one measurement data in each time increment over passage of time is sufficient, using partially sampled measurement data for each predetermined collection time from a plurality of measurement devices does not change the amount of information that can be acquired, and necessary information can conceivably be ultimately obtained. Accordingly, in the present embodiment, collection intervals are provided for each measurement terminal to perform collection of measurement data, as shown to the right in FIG. 2. Thus, electric power consumption of the measurement terminals equivalent to the open collection interval can be suppressed.

A configuration of the present embodiment will be described below.

Figure 3:
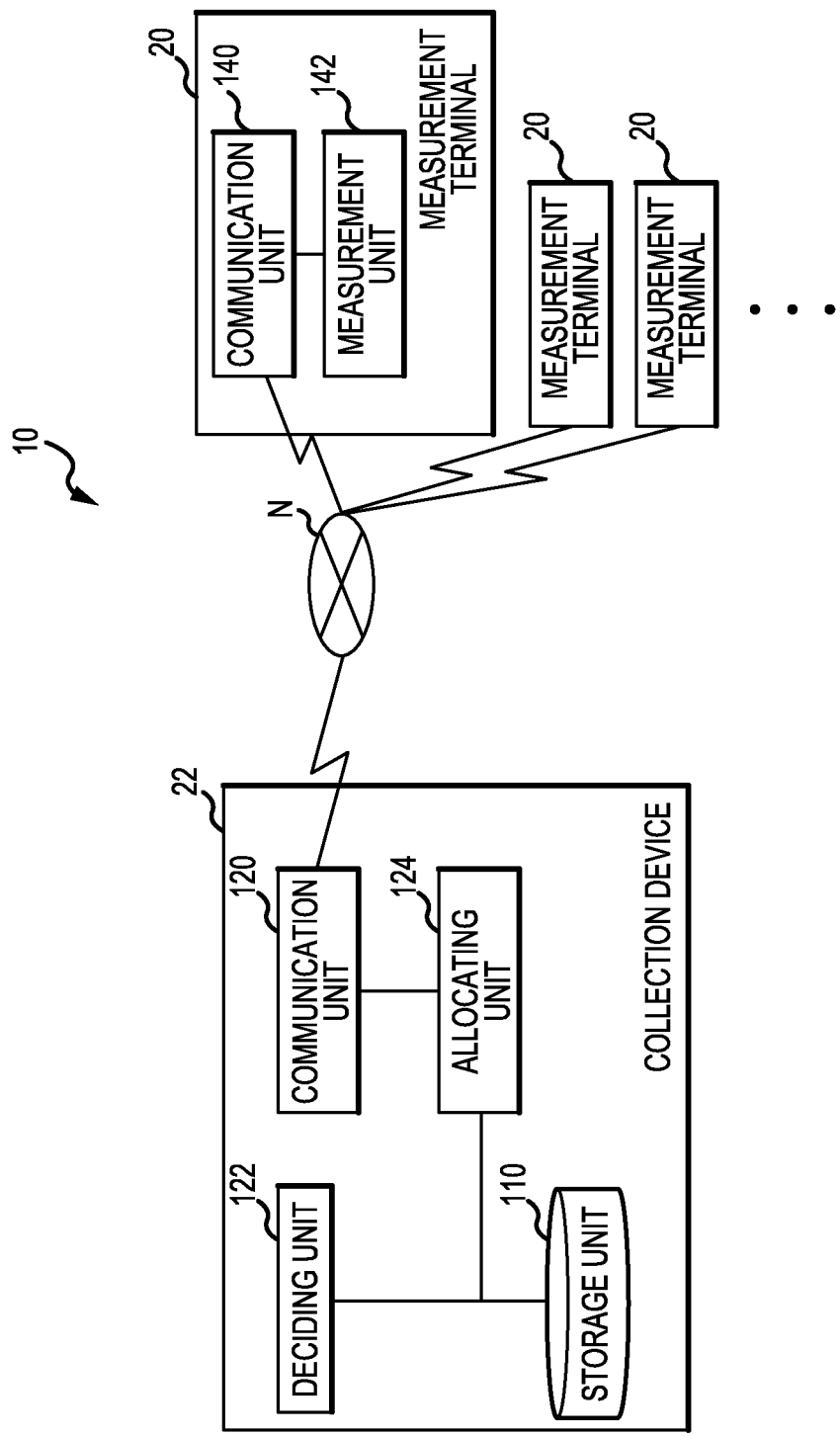
FIG. 3 is a block diagram illustrating an example of a configuration of a collection system according to the present embodiment.

FIG. 3 is a block diagram illustrating an example of a configuration of a collection system 10 according to the present embodiment. The collection system 10 according to the present embodiment includes a plurality of measurement terminals 20 and a collection device 22, as illustrated in FIG. 3. The plurality of measurement terminals 20 and the collection device 22 are connected by a predetermined network N (e.g., Internet lines or the like).

The collection device 22 is configured including a communication unit 120, a deciding unit 122, and an allocating unit 124, as illustrated in FIG. 3.

Figure 4:
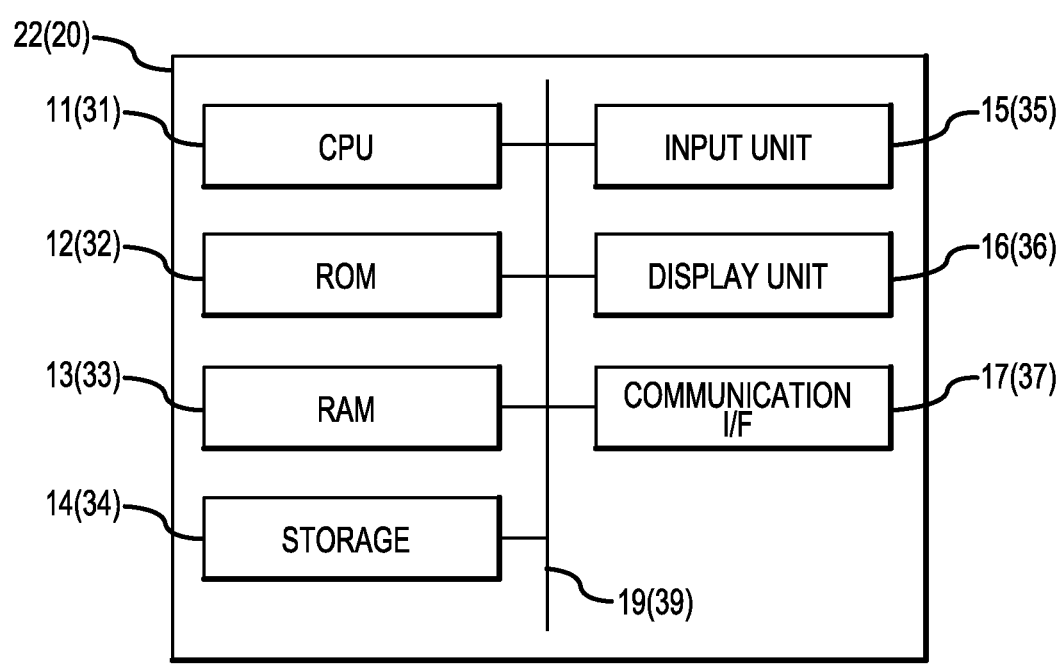
FIG. 4 is a block diagram illustrating a hardware configuration of a collection device and a measurement terminal.

FIG. 4 is a block diagram illustrating a hardware configuration of the collection device 22.

As illustrated in FIG. 4, the collection device 22 has a CPU (Central Processing Unit) 11, ROM (Read Only Memory) 12, RAM (Random Access Memory) 13, a storage 14, an input unit 15, a display unit 16 and a communication interface (I/F) 17. The configurations are each communicably connected to each other via a bus 19.

The CPU 11 is a central processing unit, and executes various types of programs and performs control of the parts. That is to say, the CPU 11 reads out programs from the ROM 12 or the storage 14, and executes the programs using the RAM 13 as a work area. The CPU 11 performs control of the above configurations and various types of computation processing, following programs stored in the ROM 12 or the storage 14. In the present embodiment, a collection program is stored in the ROM 12 or the storage 14.

The ROM 12 stores various types of programs and various types of data. The RAM 13 temporarily stores programs or data, as a work area. The storage 14 is configured of an HDD (Hard Disk Drive) or an SSD (Solid State Drive), and stores various types of programs including an operating system, and various types of data.

The input unit 15 includes a pointing device such as a mouse or the like, and a keyboard, and is used to perform various types of input.

The display unit 16 is a liquid crystal display, for example, and displays various types of information. The display unit 16 may employ a touchscreen form, and function as the input unit 15 as well.

The communication interface 17 is an interface for communication with other devices, such as terminals and the like, and uses standards such as, for example, Ethernet (registered trademark), FDDI, Wi-Fi (registered trademark), and so forth.

Note that the measurement terminal 20 may be configured of a hardware configuration the same as that of the collection device 22 as well. As illustrated in FIG. 4, the measurement terminal 20 has a CPU 31, ROM 32, RAM 33, a storage 34, an input unit 35, a display unit 36 and a communication I/F 37. The configurations are each communicably connected to each other via a bus 39. A measurement program is stored in the ROM 32 or the storage 34.

Next, the functional configurations of the measurement terminal 20 and the collection device 22 of the collection system 10 will be described. The functional configurations of the collection device 22 are realized by the CPU 11 reading out the collection program stored in the ROM 12 or in the storage 14, loading to the RAM 13, and executing.

The measurement terminal 20 is a terminal that an optional user possesses. The measurement terminal 20 is provided with a communication unit 140 and a measurement unit 142. The measurement terminal 20 periodically acquires the current position of the own terminal by GPS or the like. The communication unit 140 transmits the current position of the own terminal to the collection device 22. The communication unit 140 also transmits measurement data measured by the measurement unit 142 to the collection device 22. The measurement unit 142 measures various types of information by a sensor (omitted from illustration) provided to the terminal itself, and acquires as measurement data. The way in which the collection time of measurement data is decided by the measurement unit 142 will be described later. Note that the communication unit 140 is an example of a second communication unit.

Next, the parts of the collection device 22 will be described. The collection device 22 is provided with a storage unit 110, the communication unit 120, the deciding unit 122, and the allocating unit 124. Note that the communication unit 120 is an example of a first communication unit.

The storage unit 110 records data obtained in each area for making decisions. The data is spatial data and movement history data. The spatial data is data representing a geographical spatial network, and is common network data expressing sideways by links and nodes connecting the links. The spatial data is data including a length D of one side of the area, a total link distance L of distances between links included in this area, and a road width W mandated for this area, for each of the areas. The movement history data is data recording a count of users having a measurement terminal that have passed through this area during a predetermined period, and data recording the movement speed of users passing through this area, for each of the areas. The movement history data is collected and recorded in advance.

The communication unit 120 acquires the current position of each of the measurement terminals 20. The communication unit 120 also transmits, to each of the measurement terminals 20 regarding which the allocating unit 124 has allocated slot Nos., the collection interval of the area in which the measurement terminal 20 is present, the collection time of this area, the number of slots in this area, and the slot No. allocated to this measurement terminal 20.

The deciding unit 122 decides collection interval and collection time in each area, on the basis of data in the storage unit 110. This will be described below in detail.

A calculation method of collection interval and collection time will be described. A premise will be made that there is a square area, of which the length of one side is D. In this area, the total link distance of distances between links included in this area is L, and a road width mandated for this area is W, the collection interval is T, and the collection time is S, using the spatial data in the storage unit 110. In this case, the collection range of this area can be expressed by L×W. When the collection range L×W increases, the object of research increases. Accordingly, setting the collection interval T to be small and the collection time S to be great enables detailed collection of measurement data to be performed. That is to say, it is sufficient to obtain the collection interval T and the collection time S such that the collection interval T is inversely proportionate to L×W, and the collection time S is proportionate thereto. Also, the movement speed is V, and the number of people moving is P, using the movement history data in the storage unit 110 regarding this area. Also, the collection period is set to be collection over P days. M people can be assumed to move for P days through the collection region that is the region of L×W. In this case, the larger the scale of M×P is, the lower the amount borne by the measurement terminals 20 overall can conceivably be made to be, and the load is dispersed by making the collection interval T large and the collection time S small. That is to say, it is sufficient to obtain the collection interval T and the collection time S such that the collection interval T is proportionate to M×P, and the collection time S to be inversely proportionate thereto. Also, if the movement speed V is slow, the movement can be estimated to be manual, such as walking, and accordingly the collection load is preferably lowered. If the movement speed V is fast, the movement can be estimated to be movement by some sort of means of transportation such as a bicycle or the like, and accordingly the collection load is preferably raised. That is to say, it is sufficient to obtain the collection interval T and the collection time S such that the collection interval T is proportionate to the movement speed V, and the collection time S is inversely proportionate thereto. Taking the above conditions into consideration, a calculation expression of the following Expression (1) for obtaining the collection interval T and the collection time S is introduced.

$$T = C_T \times \sqrt{1/a \times (M \times P) \times 1/V} \quad \text{[Math 1]}$$

$$S = C_S \times \sqrt{a \times 1/(M \times P) \times V} \quad (1)$$

Note that a=(L×W)/(D×D), and $C_T$ and $C_S$ are constants.

The above is the calculation method for the collection interval and the collection time. The deciding unit 122 finds the coefficient a that is found from the length D of one side of the area, the total link distance L, and the road width W regarding this area, for each of the areas. The deciding unit 122 then calculates and decides the collection interval T and the collection time S in accordance with the above Expression (1) set regarding the coefficient a, the number of people M, the collection period P, and the movement speed V, for each of the areas.

Figure 5:
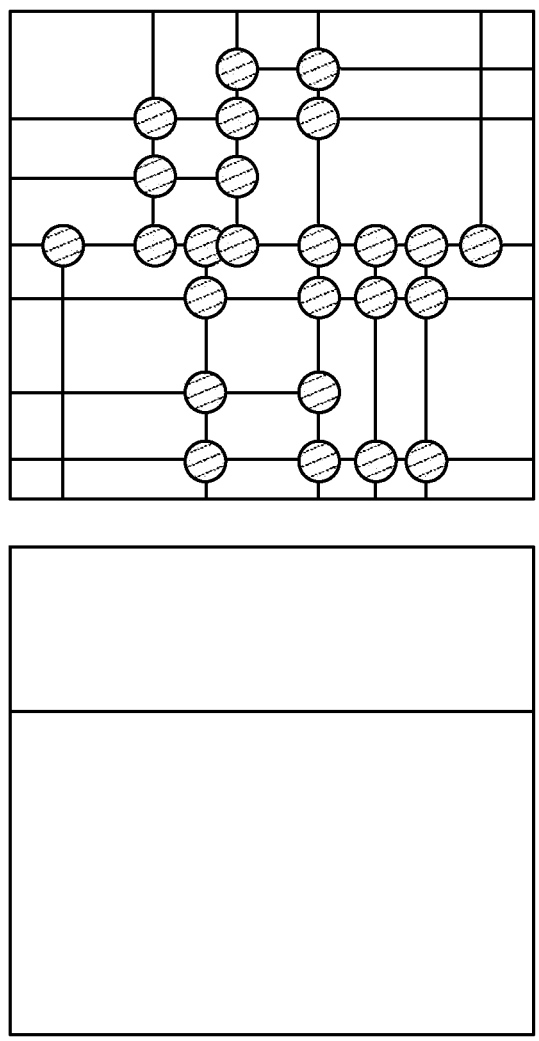
FIG. 5 is a conceptual diagram representing an area by links and nodes.

A calculation example of the collection interval T and the collection time S will be described. Note that an omitted form will be written with symbols alone. FIG. 5 is a conceptual diagram representing an area with links and nodes. In the area to the upper side in FIG. 5, D=10, L=100, W=0.01, V=1, and P=90, for example. In this case, if M=2, T=134.16 and S=74.54 can be calculated. Also, if M=100, T=948.68 and S=10.54 can be calculated. Also, in the area to the lower side in FIG. 5, D=10, L=10, W=0.005, V=1, and P=90, for example. In this case, if M=2, T=600.0 and S=16.67 can be calculated. Also, if M=100, T=4242.64 and S=2.36 can be calculated.

In a case where there is an area corresponding to the current position acquired with regard to each of the measurement terminals 20, the allocating unit 124 calculates a slot count of slots to which the collection interval T and the collection time S are cyclically allocated, on the basis of the collection interval T and the collection time S for this area. The allocating unit 124 allocates slot Nos. of an amount equivalent to the slot count, to any of the measurement terminals 20 present in this area, by a predetermined method. Calculation of the slot count and allocation of slot Nos. will be described in detail below.

Figure 6:
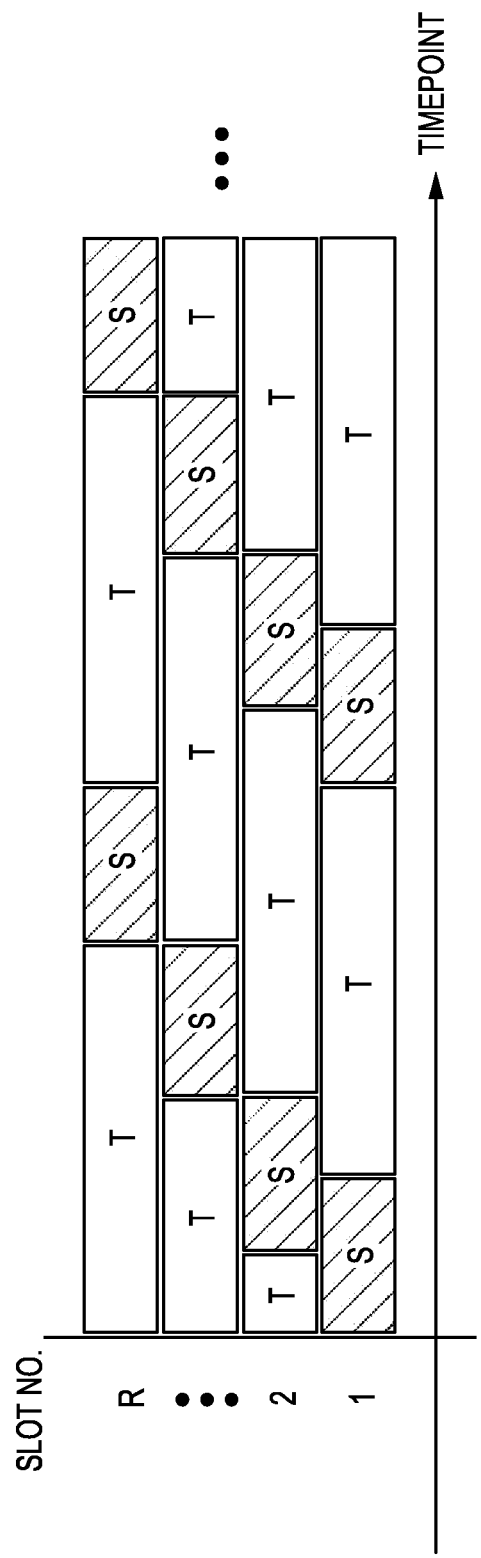
FIG. 6 is a diagram illustrating an example of allocation of collection interval T and collection times S as to the time point of each slot No.

FIG. 6 is a diagram illustrating an example of allocating the collection interval T and the collection time S to the time points for each slot No. For example, if T/S=A, and the remainder of A is B, when B=0, the slot count R=A and B≠0, the slot count R=A+1. FIG. 6 is an example of allocation in a case where the slot count R=A+1. As illustrated in FIG. 6, the allocating unit 124 sets the collection interval T and the collection time S for each slot No., for each slot No. for the slot count R worth of slots, so as to cyclically repeat collecting in order during the collection period P. Allocation of slot Nos. to the measurement terminal 20 is performed on the basis of the least connection method. As shown in Expression (2) below, slot Nos. r are found for the slot count R of slots $U_i$, so that the count of allocation is smallest, and the slot Nos. r are dynamically allocated to the measurement terminal 20.

$$r = \arg\min U_i (i=1,2,\ldots,R) \quad (2)$$

Now, in order to manage the slots, slots of slot Nos. r to be allocated to the measurement terminals 20 are taken as $U_r$. That is to say, slots $U_r$ are allocated to measurement terminals 20 present within the area, in ascending order from 1 in order to slot count R. In order to thoroughly collect information within the area, a state where information is being collected by any of the measurement terminals 20 is necessary, and allocation of slot Nos. by the allocating unit 124 enables suppressing people in the area and adjustment of timing to start collection.

Next, the way in which the timing for the collection time S is decided for the measurement terminal 20 will be described. The collection interval T and the collection time S for each slot is as set forth in FIG. 6. Now, the measurement terminal 20 calculates a suppression time $T_W$ which is time to suppress collection, on the basis of the collection interval T of the area in which the own terminal is present, the collection time S of this area, the slot count R of this area, and the slot No. r allocated to the own terminal, at the measurement unit 142. The suppression time $T_W$ is calculated by $T_W = T - S^*(R-r)$, where T=0 holds when T<0. After the suppression time $T_W$ elapses, the measurement unit 142 measures the measurement data for the collection time S. The measurement terminal 20 transmits measurement information including the measurement data, the current position, and the slot No. r to the measurement terminal 20 from the communication unit 140. Transmission intervals may be predetermined intervals.

Upon collection device 22 receiving the measurement information, the allocating unit 124 determines whether or not the slot No. r is within the allocated area. If the current position of the measurement information is within this area, an in-area notification, to the effect of being in the area, is transmitted to the measurement terminal 20. After receiving the in-area notification, the measurement terminal sets $T_W = T$, and after the suppression time $T_W$ elapses, processing for measuring measurement data by sensors for the collection time S is repeated. If outside of this area, an out-of-area notification, to the effect of being outside of the area, is transmitted to the measurement terminal 20, $U_r = U_{r-1}$ is set, and the collection interval T, the collection time S, and a slot No. r, of an area in which the measurement terminal 20 is newly positioned, is transmitted to the measurement terminal 20.

Next, operations of the collection system 10 will be described.

Figure 7:
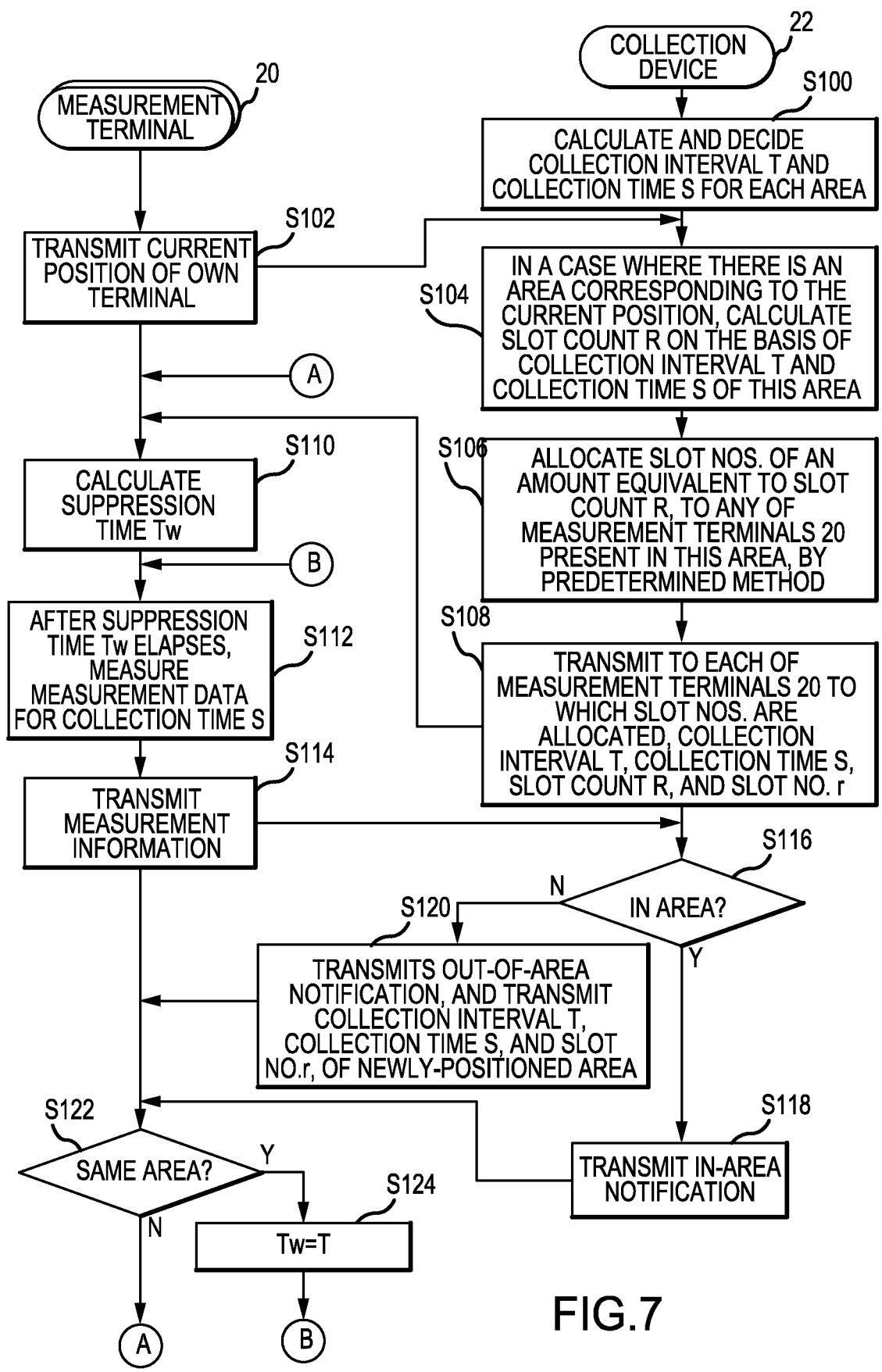
FIG. 7 is a sequence diagram showing the flow of measurement processing and collection processing by the collection system.

FIG. 7 is a sequence diagram showing the flow of measurement processing and collection processing by the collection system 10. The collection processing is carried out by the CPU 11 of the collection device 22 reading out the collection program from the ROM 12 or the storage 14, loading to the RAM 13, and executing. In the same way, in each of the measurement terminals 20, the CPU 31 reads out the measurement program from the ROM 32 or the storage 34 and performs measurement processing.

In step S100, the CPU 11 calculates and decides the collection interval T and the collection time S, following the above Expression (1) set regarding the coefficient a, the number of people M, the collection period P, and the movement speed V for each of the areas. The coefficient a is found from the length D of one side of the area, the total link distance L, and the road width W, regarding this area, referencing spatial data in the storage unit 110 for each of the areas, and is used for the above calculation.

In step S102, the CPU 31 transmits the current position of the own terminal to the collection device 22.

In a case where there is an area corresponding to the current position acquired regarding each of the measurement terminals 20 in step S104 the CPU 11 calculates the slot count R of slots regarding which the collection interval T and the collection time S are cyclically allocated, on the basis of the collection interval T and the collection time S of this area.

In step S106, the CPU 11 allocates slot Nos. of an amount equivalent to the slot count R, to any of the measurement terminals 20 present in this area, by a predetermined method.

In step S108, the CPU 11 transmits, to each of the measurement terminals 20 to which slot Nos. are allocated, the collection interval T of the area in which the measurement terminal 20 is present, the collection time S of this area, the slot count R of this area, and the slot No. r allocated to the measurement terminal 20. The slots $U_r$ allocated to the measurement terminals 20 are also recorded, to manage slots.

In step S110, the CPU 31 calculates the suppression time $T_W$ on the basis of the collection interval T of the area in which the own terminal is present, the collection time S of this area, the slot count R of this area, and the slot No. r allocated to the own terminal.

In step S112, after the suppression time $T_W$ elapses, the CPU 31 measures measurement data by the sensors for the collection time S.

In step S114, the CPU 31 transmits measurement information including the measurement data, the current position, and the slot No. r.

In step S116, the CPU 11 determines, from the current position of the measurement information, whether or not within the area regarding which the slot No. r was allocated. If within the area, the flow transitions to step S118, and if outside the area, transitions to step S120.

In step S118, the CPU 11 transmits an in-area notification, to the effect of being in the area, to the measurement terminal 20. In step S120, the CPU 11 transmits an out-of-area notification, to the effect of being outside of the area, to the measurement terminal 20, sets the $U_r$ of this area to $U_r=U_{r-1}$, and transmits the collection interval T, the collection time S, and a slot No. r, of the newly-positioned area. Note that in a case where the current position is not in a collection object area, empty data may be transmitted, and the processing of step S102 started.

In step S122, the CPU 31 determines whether or not the same area or not. If an in-area notification is received, determination is made that the same area, and if an out-of-area notification is received, determination is made that the area is not the same area but a new area. If the same area, the flow transitions to step S126. If a new area, the flow transitions to step S110, calculates the suppression time $T_W$ for the new area, and measures measurement data for the new area.

In step S124, the CPU 31 sets $T_W=T$, returns to step S112, and repeats processing.

The collection system 10 collects measurement data by the sequence of the above steps.

As described above, according to the collection system 10 of the present embodiment, measurement data can be efficiently collected so as to suppress electric power consumption of the entire system.

Note that in cases where there are different means of transportation, such as foot, bicycle, and so forth, the movement speed V is presumed to be different for each means of transportation. Accordingly, the deciding unit 122 may calculate the collection interval T and the collection time S following the above Expression (1) for each area, for each means of transportation, for each of the areas. In this case, the collection interval T and the collection time S may be calculated using the movement speed V for the means of transportation. Also, the allocating unit 124 may deduce the means of transportation from transition of the current position of the measurement terminal 20, and then allocate the collection interval T and the collection time S corresponding to the means of transportation, and manage the slots by each means of transportation. Accordingly, an appropriate collection interval T and collection time S can be set in accordance with the means of transportation.

Note that various types of processors other than a CPU may execute the collection processing that the CPU performs by reading in software (programs) and executing in the above embodiments. Examples of processors in this case include dedicated electric circuits and so forth that are processors having a circuit configuration designed for dedicated execution of particular processing, such as PLDs (Programmable Logic Device) of which the circuit configuration can be changed after manufacturing, like FPGAs (Field-Programmable Gate Array) and so forth, and ASICs (Application Specific Integrated Circuit) and so forth. This collection processing may also be executed by one of these various types of processors, or may be executed by a combination of two or more processors of the same type or different types (e.g., a plurality of FPGAs, a combination of a CPU and an FPGA, and so forth). More specifically, the hardware configuration of these various types of processors are electric circuits where circuit elements such as semiconductor elements and so forth are combined. Note that the same may be true regarding measurement processing as well.

Also, while description is made in the above embodiments regarding an arrangement in which a collection program is stored (installed) in the storage 14 in advance, this is not limiting. The program may be provided in a form stored in a non-transitory storage medium, such as CD-ROM (Compact Disk Read Only Memory), DVD-ROM (Digital Versatile Disk Read Only Memory), USB (Universal Serial Bus) memory, and so forth. A form may also be made in which the program is downloaded from an external device via a network. Note that the same may be true regarding the measurement program as well.

In relation to the above embodiment, the following appendices are further disclosed.

(Appendix 1)

A collection device, including memory, and at least one processor connected to the memory, wherein the processor is configured to decide, on the basis of data obtained in advance for each area, a collection interval and a collection time for each of the areas, acquire a current position from each of measurement terminals, calculate, in a case where there is the area corresponding to the current position acquired regarding each of the measurement terminals, a slot count of slots regarding which the collection interval and the collection time are cyclically allocated, on the basis of the collection interval and the collection time of this area, and allocate slot numbers of an amount equivalent to the slot count, to any of the measurement terminals present in this area, by a predetermined method, transmit, to each of the measurement terminals to which the slot numbers are allocated, the collection interval of the area in which the measurement terminal is present, the collection time of this area, the slot count of this area, and the slot number allocated to the measurement terminal, and receive measurement information including measurement data measured on the basis of the collection interval and the collection time, from each of the measurement terminals to which the slot numbers are allocated.

(Appendix 2)

A non-transitory storage medium storing a collection program that causes a computer to execute deciding, on the basis of data obtained in advance for each area, a collection interval and a collection time for each of the areas, acquiring a current position from each of measurement terminals, calculating, in a case where there is the area corresponding to the current position acquired regarding each of the measurement terminals, a slot count of slots regarding which the collection interval and the collection time are cyclically allocated, on the basis of the collection interval and the collection time of this area, and allocating slot numbers of an amount equivalent to the slot count, to any of the measurement terminals present in this area, by a predetermined method, and transmitting, to each of the measurement terminals to which the slot numbers are allocated, the collection interval of the area in which the measurement terminal is present, the collection time of this area, the slot count of this area, and the slot number allocated to the measurement terminal, and receiving measurement information including measurement data measured on the basis of the collection interval and the collection time, from each of the measurement terminals to which the slot numbers are allocated.

REFERENCE SIGNS LIST

10 Collection system
20 Measurement terminal
22 Collection device
110 Storage unit
120 Communication unit
122 Deciding unit
124 Allocating unit
140 Communication unit
142 Measurement unit

The invention claimed is:

1. A collection device comprising circuitry configured to execute a method comprising:
   deciding, based on data obtained in advance for each area, a collection interval and a collection time for each of the areas;
   acquiring a current position from each of measurement terminals; and
   when there is the area corresponding to the current position acquired regarding each of the measurement terminals:
      calculating a slot count of slots regarding which the collection interval and the collection time are cyclically allocated, on the basis of the collection interval and the collection time of this area; and
      allocating the slot numbers of an amount equivalent to the slot count, to a measurement terminals present in the area, wherein
      the allocating includes transmitting, to each of the measurement terminals to which the slot numbers are allocated, the collection interval of the area in which the measurement terminal is present, the collection time of this area, the slot count of this area, and the slot numbers allocated to the measurement terminal, and receiving measurement information including measurement data measured on the basis of the collection interval and the collection time, from each of the measurement terminals to which the slot numbers are allocated.

2. The collection device according to claim 1, wherein the data includes spatial data and movement history data,
   the spatial data includes data about a length of one side of the area, a total link distance of distances between links included in this area, and road width mandated for this area, for each of the areas,
   the movement history data includes a count of users having a measurement terminal that have passed through the area during a predetermined period, and movement speed of users passing through the area, for each of the areas, and
   the circuitry further comprises executing a method comprising:
      determining a coefficient from the length, the total link distance, and the road width; and
      calculating and deciding the collection interval and the collection time in accordance with a calculation expression set regarding the coefficient, the number of people, a predetermined collection period, and the movement speed.

3. The collection device according to claim 1, wherein the allocating further includes causing one or more measurement terminals of the measurement terminals to suppress collecting the measurement data for a time period based on the collection interval, thereby suppressing electric power consumption of the one or more measurement terminals of the measurement terminals.

4. A collection system, comprising:
   a first processor;
   a first memory storing first computer-executable instructions that when executed by the first processor cause the system to execute a first method comprising:
      deciding, based on data obtained in advance for each area, a collection interval and a collection time for each of the areas;
      acquiring a current position from each of measurement terminals; and
      when there is the area corresponding to the current position acquired regarding each of the measurement terminals:
         calculating a slot count of slots regarding which the collection interval and the collection time are cyclically allocated, on the basis of the collection interval and the collection time of this area; and
         allocating slot numbers of an amount equivalent to the slot count, to a the measurement terminals present in this area, wherein
         the allocating includes transmitting, to each of the measurement terminals to which the slot numbers are allocated, the collection interval of the area in which the measurement terminal is present, the collection time of this area, the slot count of this area, and the slot number allocated to the measurement terminal, and receiving measurement information including measurement data measured on the basis of the collection interval and the collection time, from each of the measurement terminals to which the slot numbers are allocated;

a second processor; and a second memory storing second computer-executable instructions that when executed by the second processor cause the system to execute a second method comprising:

transmitting a current position of a measurement terminal;

calculating a suppression time which is time to suppress collection, on the basis of a collection interval of an area in which the measurement terminal is present, a collection time of this area, a slot count of this area, and a slot number allocated to the measurement terminal; and after the suppression time elapses:

measuring the measurement data for the collection time; and, transmitting measurement information including the measurement data that is measured, the current position, and the slot number.

5. The collection system according to claim 4, wherein the data includes spatial data and movement history data, the spatial data includes data about a length of one side of the area, a total link distance of distances between links included in this area, and road width mandated for this area, for each of the areas, the movement history data includes a count of users having a measurement terminal that have passed through the area during a predetermined period, and movement speed of users passing through the area, for each of the areas, and the circuitry further comprises executing a method comprising:

determining a coefficient from the length, the total link distance, and the road width; and calculating and deciding the collection interval and the collection time in accordance with a calculation expression set regarding the coefficient, the number of people, a predetermined collection period, and the movement speed.

6. The collection system according to claim 4, wherein the allocating further includes causing one or more measurement terminals of the measurement terminals to suppress collecting the measurement data based on the collection interval, and the second computer-executable instructions when executed further causing the system to execute a second method comprising:

suppressing the measuring the measurement data for the collecting interval, thereby suppressing electric power consumption of the one or more measurement terminals of the measurement terminals.

7. A computer-implemented method for collecting information, comprising:

deciding, by a server on the basis of data obtained in advance for each area, a collection interval and a collection time for each of the areas;

acquiring, by the server, a current position from each of measurement terminals;

calculating, in a case where there is the area corresponding to the current position acquired regarding each of the measurement terminals, a slot count of slots regarding which the collection interval and the collection time are cyclically allocated, on the basis of the collection interval and the collection time of this area, and allocating slot numbers of an amount equivalent to the slot count, to any of the measurement terminals present in this area;

transmitting, to each of the measurement terminals to which the slot numbers are allocated, the collection interval of the area in which the measurement terminal is present, the collection time of this area, the slot count of this area, and the slot number allocated to the measurement terminal; and receiving measurement information including measurement data measured on the basis of the collection interval and the collection time, from each of the measurement terminals to which the slot numbers are allocated.

8. The computer-implemented method according to claim 7, wherein the data includes spatial data and movement history data, the spatial data includes data about a length of one side of the area, a total link distance of distances between links included in this area, and road width mandated for this area, for each of the areas, the movement history data includes a count of users having a measurement terminal that have passed through the area during a predetermined period, and movement speed of users passing through the area, for each of the areas, and the method comprising:

determining a coefficient from the length, the total link distance, and the road width; and calculating and deciding the collection interval and the collection time in accordance with a calculation expression set regarding the coefficient, the number of people, a predetermined collection period, and the movement speed.

9. The computer-implemented method according to claim 7, the method further comprising:

causing one or more measurement terminals of the measurement terminals to suppress collecting the measurement data for a time period based on the collection interval, thereby suppressing electric power consumption of the one or more measurement terminals of the measurement terminals.

* * * * *